United States Patent [19]
Flory et al.

[11] Patent Number: 5,031,404
[45] Date of Patent: Jul. 16, 1991

[54] PRESSURIZED AIR BOOSTER

[75] Inventors: Donald M. Flory, Arcanum; Craig A. Osterday, Dayton; Edward J. DeHoff, Huber Heights; Donald E. Schenk, Vandalia; Jon E. Miller, Spring Valley, all of Ohio

[73] Assignee: General Motors Corporation, Detroit, Mich.

[21] Appl. No.: 413,528

[22] Filed: Sep. 27, 1989

[51] Int. Cl.⁵ ............ B60T 13/26; F15B 9/10; F15B 21/04; F16K 15/14
[52] U.S. Cl. .................. 60/547.1; 60/550; 60/453; 91/373; 91/376 R; 92/78; 92/81; 92/97; 92/100; 251/358; 137/854
[58] Field of Search .............. 91/369.1, 369.2, 370, 91/372-374, 376 R, 377, 422, 222; 92/81, 97, 98 R, 100, 78; 60/547.1, 582, 550, 378, 407, 453; 251/358; 137/854

[56] References Cited

U.S. PATENT DOCUMENTS

| | | | |
|---|---|---|---|
| 2,579,855 | 12/1951 | Pockel et al. | 137/854 |
| 3,055,390 | 9/1962 | Scheldorf | 137/854 X |
| 4,109,464 | 8/1978 | Wickland | 92/78 X |
| 4,633,760 | 1/1987 | Wagner | 91/376 R X |
| 4,711,224 | 12/1987 | Eckhardt | 137/854 X |
| 4,805,661 | 2/1989 | Knapp et al. | 137/854 X |
| 4,883,023 | 11/1989 | Tsang et al. | 123/25 A |
| 4,905,571 | 3/1990 | De Hoff et al. | 92/97 X |

Primary Examiner—Edward K. Look
Assistant Examiner—George Kapsalas
Attorney, Agent, or Firm—Ernest E. Helms

[57] ABSTRACT

The invention provides a brake booster including in a preferred embodiment a housing, first and second annular flexible diaphragms spaced from one another forming a sealed second chamber within the housing and a sealed first chamber between the first diaphragm and the first end of the housing, a generally annular shaped power piston for connection with the master cylinder piston, a chamber valve seat separating the first and second chambers, an inlet valve slidably mounted within the power piston, and a control valve spring biased away from the power piston and connected with the pedal linkage and being slidably and sealably mounted within first end of the housing.

14 Claims, 7 Drawing Sheets

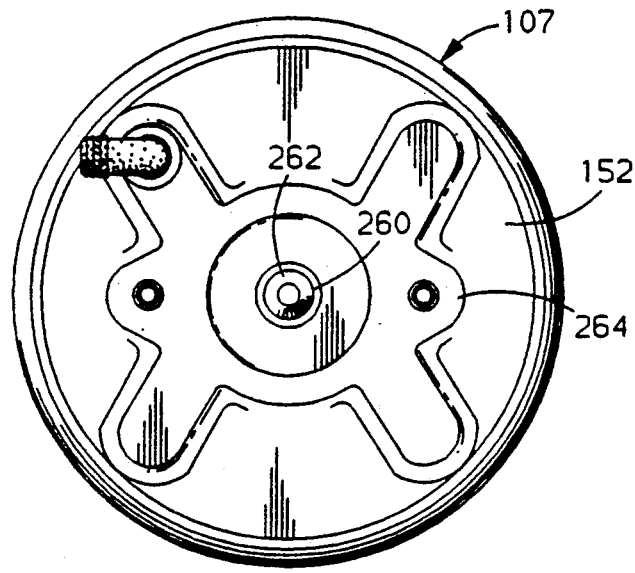
FIG. 7
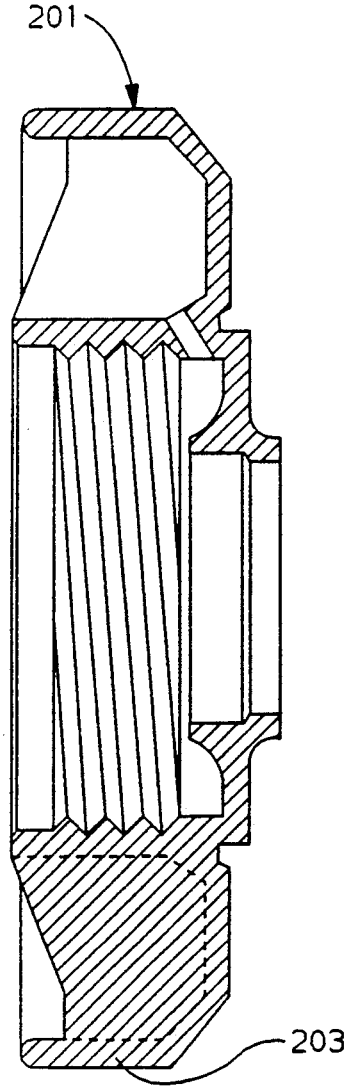
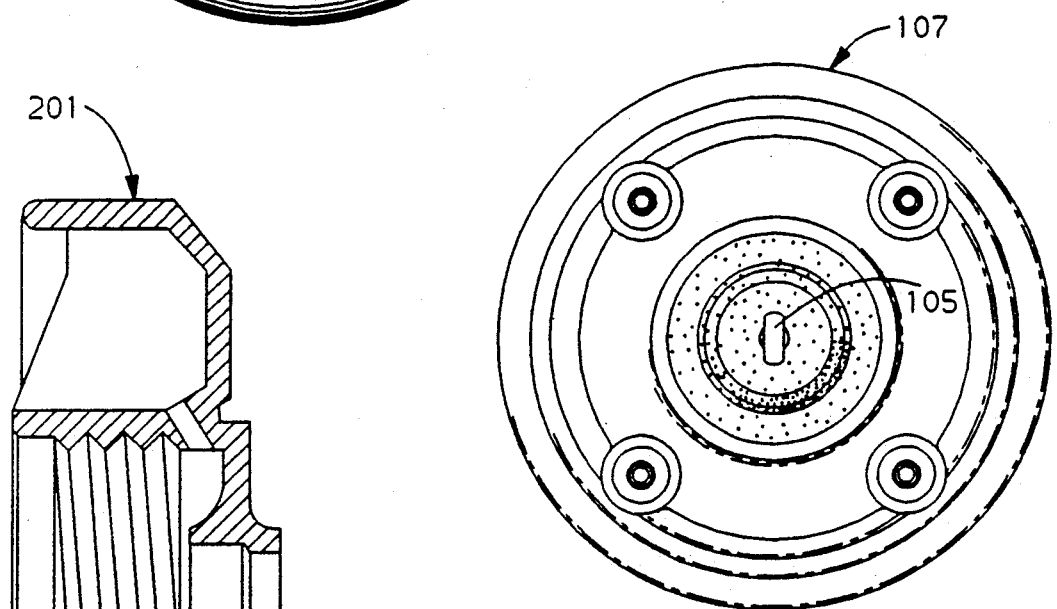
FIG. 8
FIG. 9

PRESSURIZED AIR BOOSTER

FIELD OF THE INVENTION

The field of this invention is that of an apparatus and method of utilization thereof of fluid powered boosters for vehicle hydraulic braking systems.

SUMMARY OF THE INVENTION

The present invention includes alternative embodiments to the invention disclosed in copending Application U.S. Ser. No. 07/239,098 filed Aug. 31, 1989, now U.S. Pat. No. 4,905,571, the disclosure of which is incorporated herein.

Further objects and advantages of the present invention can become more apparent to those skilled in the art as the nature of the invention is better understood from the accompanying drawings and a detailed description.

BRIEF DESCRIPTION OF THE DRAWINGS

FIGS. 7 and 8 are end views of a booster shown in FIG. 3;

FIG. 9 is a detailed view of the first half of the power piston;

DETAILED DESCRIPTION OF THE PREFERRED EMBODIMENTS

Figure 1:
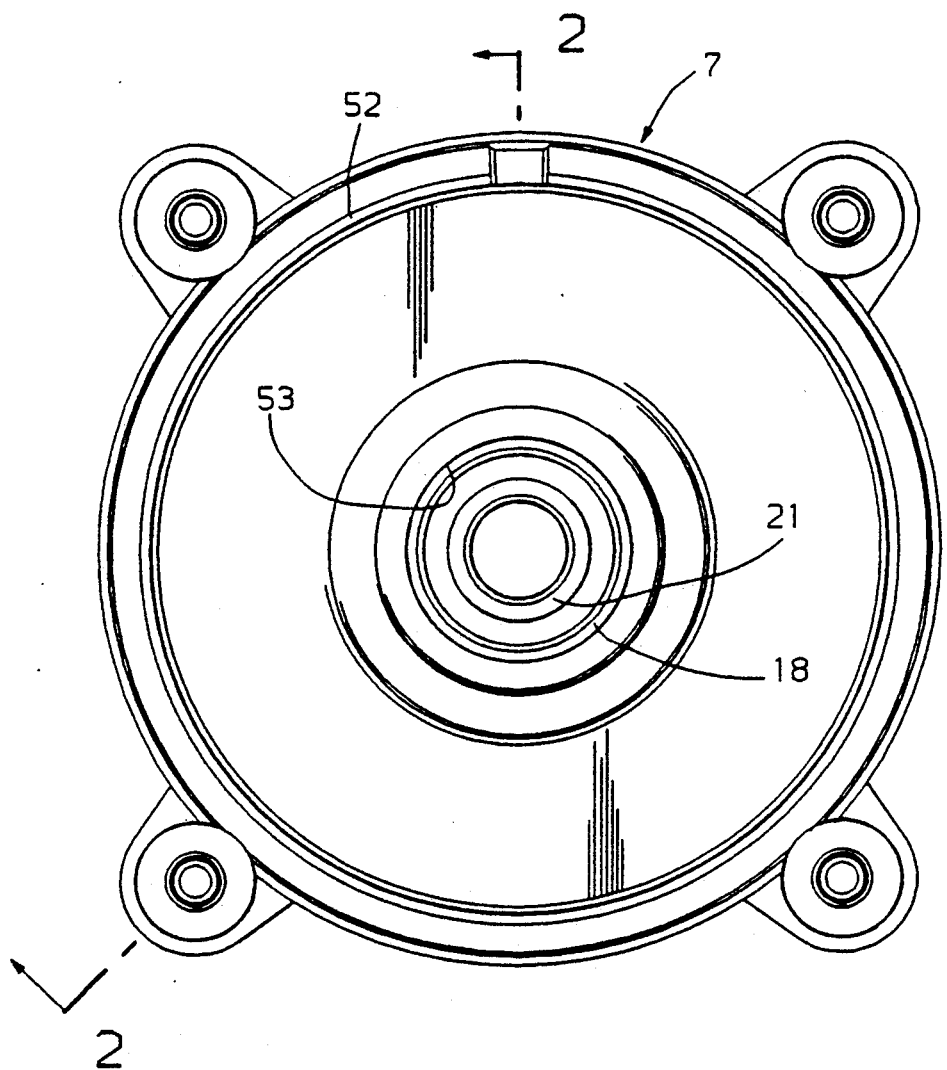
FIG. 1 is a side elevational view of a preferred embodiment brake booster according to the present invention.
Figure 2:
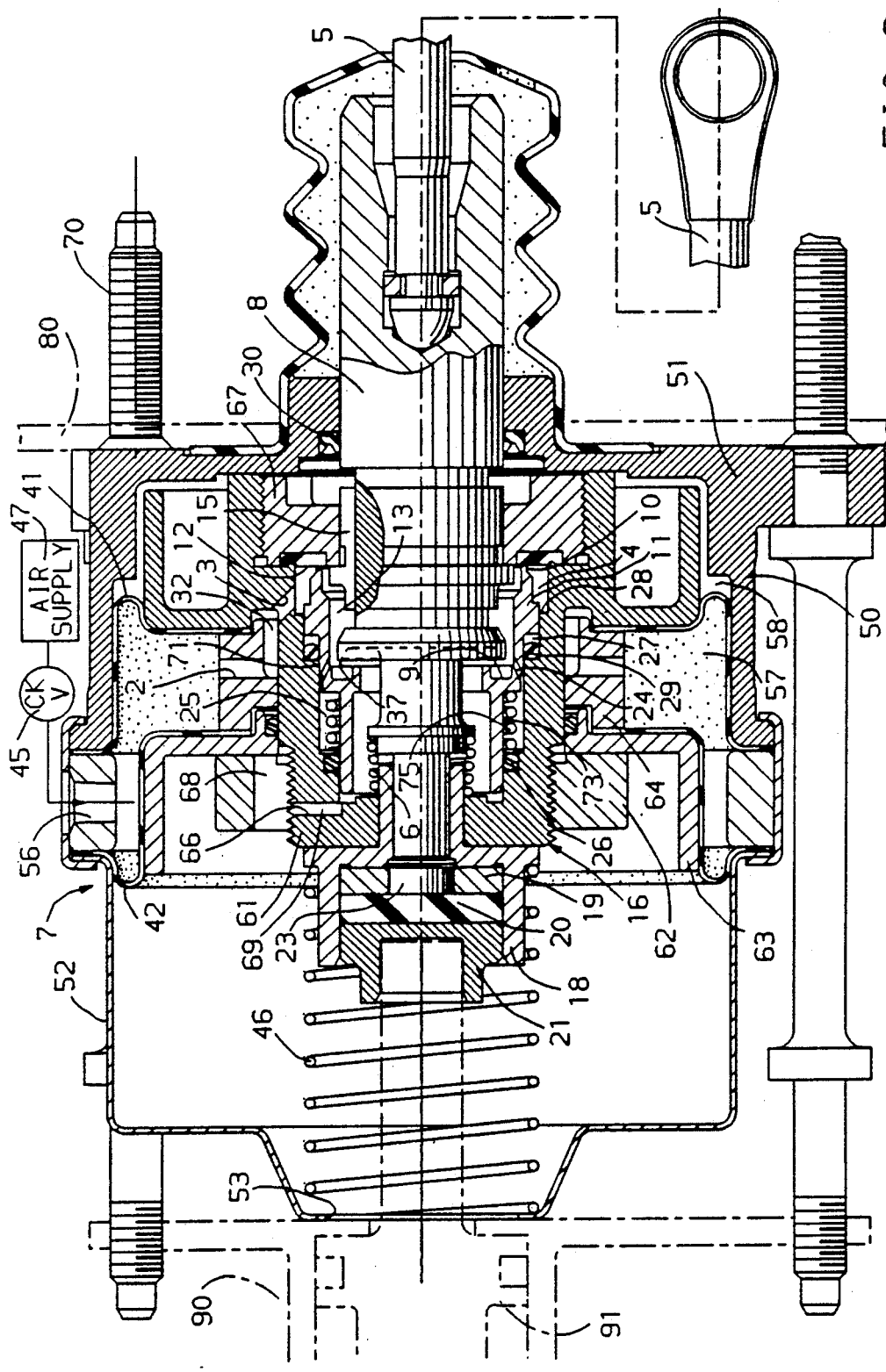
FIG. 2 is a view along line 2—2 of FIG. 1.

Referring to FIGS. 1 and 2 inventive pneumatic brake booster system 7 is a servomechanism designed to multiply the manual pedal force provided by a driver of a vehicle brake system 80 to provide operate a vehicle brake system via a master cylinder piston 91. The booster 7 is connected between a brake pedal linkage 5 and the piston 91 of the master cylinder 90. Pressurized air is the energy transfer medium described below, however, other mediums (for example, hydraulic fluid) may be used with minor modifications.

FIG. 2 shows the booster 7 in the normal position prior to brake application. The booster 7 has a housing 50. The housing 50 has a first end 51 and a second end 52. First end 51 is generally sealed and second end 52 is open to the atmosphere through a vent 53. First end 51 also has an inlet 56.

Within the housing 50 are two annular flexible diaphragms 41, 42 which are spaced from one another forming a sealed air storage second chamber 57 or air reservoir. The second chamber 57 is in fluid communication with the fluid inlet 56. Between the first flexible diaphragm 41 and the housing first end 51 is a sealed first chamber 58. Sealingly connected with the first 41 and second 42 diaphragms along its exterior is an annular shaped power piston 16. The piston 16 has an inner ring 61, front ring 62, intermediate ring 63 and rearward ring 64. The rearward ring 64 mounts first and second diaphragms 41 and 42 respectively. Intermediate ring 63 forms second diaphragm 42. Front ring 62 is threaded to inner ring 61 and holds rings 63 and 64 in place. The piston 16 has a first fluid passage 32 connecting the second chamber 57 with the interior of piston. Passage 32 is comprised of passage 2 in ring 64 and passage 3 in ring 61. The piston 16 is biased in a first direction away from the master cylinder by a spring 46.

The piston 16 has a second fluid passage 66 from its interior to an area of the housing second end 52 formed by slots 69 and 68 of rings 62 and 61 respectively. A chamber valve seat insert 67 separating the first 58 and second 57 fluid chambers is threadably connected to the ring 61. Valve seat insert 67 has a chamber valve seat sealing surfaces 12 made of a compressible material. Control valve 8 has a passage 15 connecting the second 57 and first 58 fluid chambers.

Slidably mounted within piston 16 is an inlet valve 11. The inlet valve 11 is biased by spring 75. The inlet valve 11 has a modulated fluid passage 24 between its interior and exterior. The inlet valve also at a first larger diameter has a valving surface 10 for contact with the valve seat 12 to prevent fluid communication between the piston first passage 32 and the first chamber 58. The inlet valve 11 also has an exterior first sliding surface 71 at the first diameter sealed by an 0-ring 29.

At a second diameter, differing from the first diameter (smaller) the inlet valve 11 has a second exterior sealing surface 73 and is sealed by 0-ring 26. At the second diameter the inlet valve 11 has an exhaust valve seat 9.

A control valve 8 is connected with the master cylinder piston 91 and the brake linkage 5. The control valve 8 is biased by a spring 6 away from the piston 16. The control valve 8 is slidably and sealably connected in the first end 51 of the housing and is sealed by a lip (or other type seal) seal 30 at the second diameter.

At the second diameter the control valve 8 has a valving surface 37 for mating with the valve seat 9 at the second diameter. Movement of the control valve 8 by the brake pedal (via push rod 5) causes the control valve valving surface 37 to contact the valve seat 9 to seal off the interior of the inlet valve 11 from the vent 53.

Pressurized air from a supply source 47 passes through a check valve 45. The air then passes into the second chamber 57. Connecting passages 2 and 3 form a power piston first fluid passage to admit supply pressurized air to the annulus 4. All other areas of the booster 7 are at atmospheric pressure. When force is applied at the push rod 5 part of the brake linkage, sufficient to overcome spring 6, the valving surface 37 of the control valve 8 is moved into contact with the valve seat 9, closing the annulus 13 from the atmosphere. Further motion (of control valve 8) moves the valving surface 10 of the inlet valve 11 away from contact with the valve seat 12 admitting the supply pressure from second chamber 57 to the annulus 13. From the annulus 13, supply pressure is admitted to first chamber 58 through passage 15 (formed by a milled slot in control valve 8). The imbalance of pressure behind power piston 16 causes a force in the direction of the push rod 5 (towards the master cylinder 90). The rolling diaphragms 41 and 42 allow the piston 16 to move in the direction of the push rod force and to push against a reaction support 18 through a reaction ring 19, through a reaction disc 20, through a master cylinder piston guide 21, and finally against the primary piston 91 of the conventional hydraulic master cylinder 90, to apply the brakes of the vehicle.

Since the reaction disc 20 is a relatively soft elastomer, the force applied to it tends to displace a portion of its volume through the slidable reaction piston 23 to the end of the control valve 8 and hence through the push rod 5 and on to the brake pedal where a force proportional to the area of master cylinder piston guide 21 and the reaction piston 23 and the lever ratio of the pedal is transmitted to the foot of the driver. The above-noted mechanism, by providing a force directly proportional to that applied to the master cylinder piston 91, provides the driver with the "feel" necessary to a controlled vehicle stop. Using this feedback mechanism, the driver is able to meter the supply pressure from second chamber 57 to first chamber 58 and is in full control of the modulated pressure in second chamber 58.

During brake supply the modulated or variable pressure also exits in the annulus 13. Passage 24 admits modulated air into an annulus 25. Since the diameter at the inside of seal 26 is equal to that of the valving surface 37 of the control valve 8, and the pressure on both areas is modulated pressure, it follows that the inlet valve 11 is balanced for any value of modulated pressure. Modulated air in annulus 13 is admitted to first chamber 58 through passage 15. Since the diameter at the inside of seal 30 is equal to that of the valving surface 37 of the control valve 8 and the pressure on both areas is modulated pressure, it follows that the control valve 8 is balanced for any value of modulated pressure. The above together with the balancing of the inlet valve 11 (described later) provides for a controlled force between valving surface 37 of the control valve 8 and the face of the valve seat 9 which is unaffected by modulated pressure.

Supply air in an annulus 4 is admitted to an annulus 27 through the clearance 28 between the inlet valve 11 and the power piston 16. Since the diameter at the inside of seal 29 is equal to that of the valving surface 10 of the inlet valve 11 and the pressure on both areas is supply pressure, the inlet valve 11 is balanced for any value of supply pressure. The above provides for a controlled force between valving surface 10 of the inlet valve 11, and the valve seat 12, which is unaffected by supply pressure.

Without the various balancing arrangements described above, the device would tend to self-apply, self-release, or create variable forces for different pressure values dependent on the magnitude and/or direction of the area imbalance.

When the force on the brake pedal is reduced, the reaction forces urge the control valve 8 in a direction to allow the valving surface 10 of the inlet valve 11 to again contact the inlet valve seat 12, sealing the annulus 13 from supply pressure and maintaining the brake apply force as is. This is known as "poise" position. Further reduction of pedal force moves the valving surface 37 of the control valve 8 away from the valve seat 9 and opens annulus 13 to atmospheric pressure. If the valving surface 37 remains out of contact with valve seat 9, all modulated pressure will be lost and the vehicle brakes will be released.

The concept of using two opposed rolling diaphragms 41,42 to admit pressurized fluid to the valving area from a stationary housing has the advantage of providing a low friction leak-proof means of transferring pressurized fluid from the stationary housing 50. Also the diaphragms 41,42 in combination with check valve 45 serve as a fluid reservoir for emergency stops when a compressible medium is employed.

The exterior bolting arrangement provides a means of transmitting brake loads from the master cylinder 90 to the support area of the vehicle fire wall 80. The above construction eliminates the necessity for heavy booster housing structures to support the brake transmitted loads. Four bolts 70 are shown in the present design. However three-bolt or two-bolt configurations are feasible. Other designs utilize bolts for carrying master cylinder loads, however, prior boosters use bolts that pierce the housing walls necessitating expensive seals with additional friction at several points on each bolt. The design of the booster 7 uses fully exterior bolts 70 that require no seals of any kind.

Figure 3:
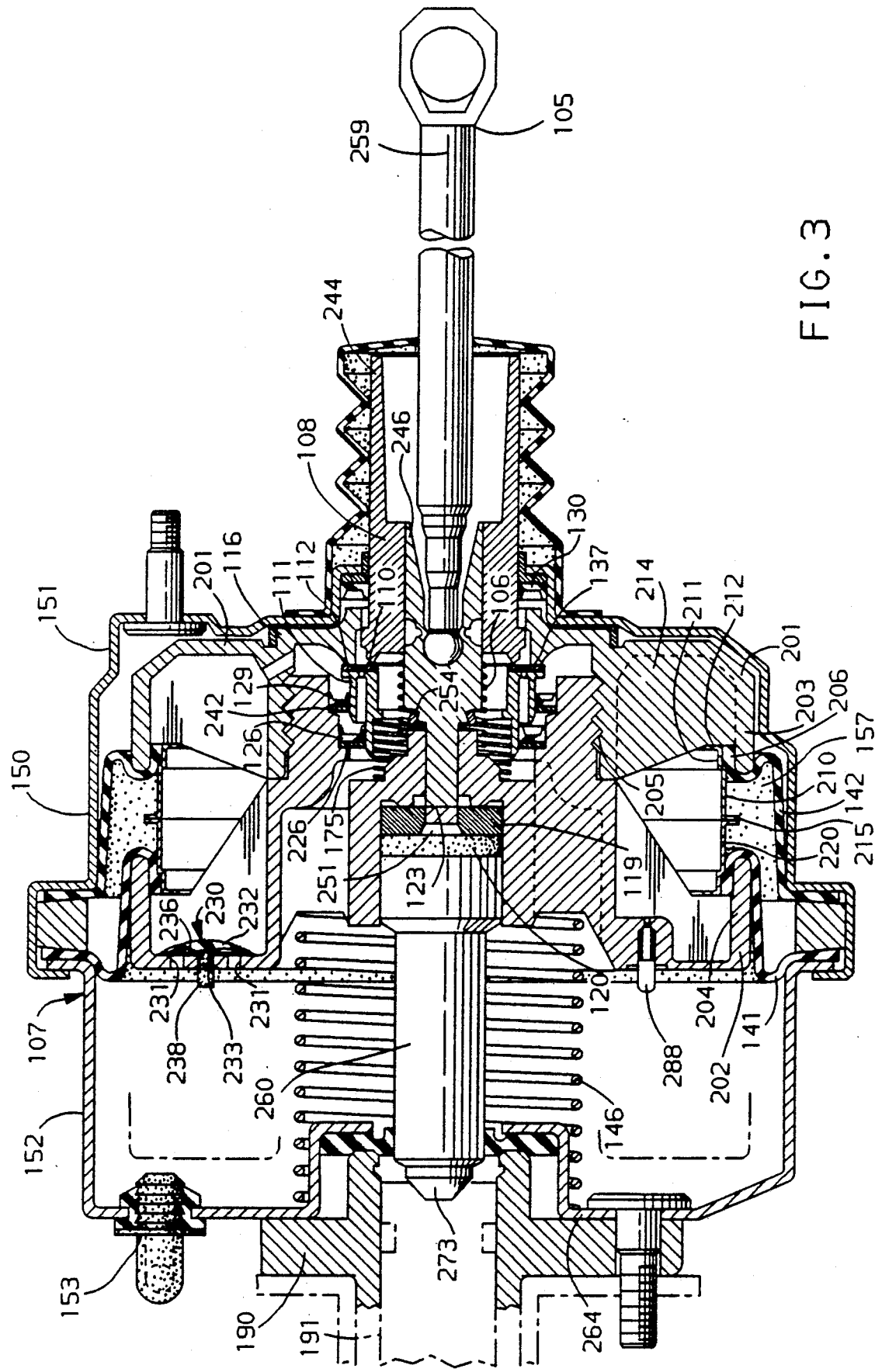
FIG. 3 is an alternative preferred embodiment to the embodiment shown in FIG. 1.
Figure 4:
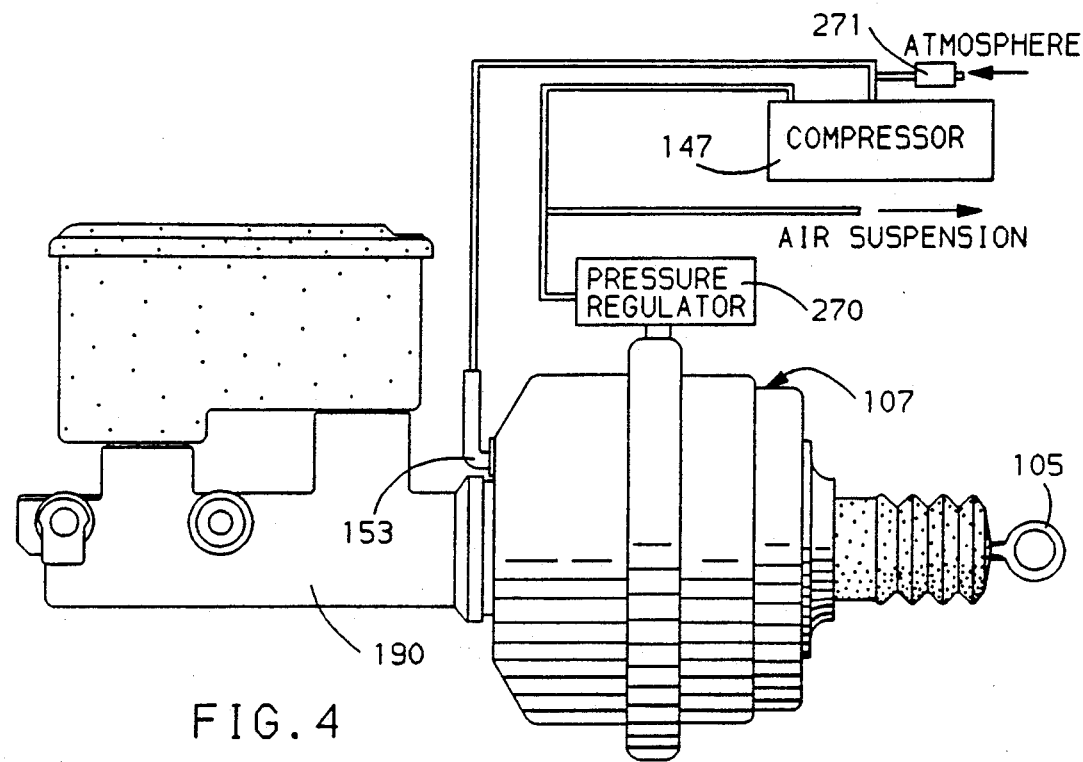
FIG. 4 is a schematic of the pneumatic system of the present embodiment shown in FIG. 3.
Figure 5:
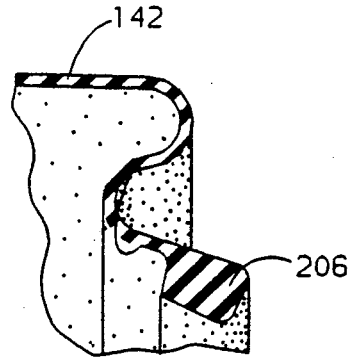
FIG. 5 is an enlarged partial view of the diaphragm shown in FIG. 3.

Referring to FIGS. 3 and 4, the preferred embodiment of the present invention is provided, which is an alternative to brake booster shown in FIG. 2. The booster 107 is connected or operatively associated between the brake pedal linkage 105 and the piston 191 of a master cylinder 190.

FIG. 3 shows the booster 107 in the normal position prior to brake application. The booster 107 has a housing 150. The housing has a first end 151 fabricated from sheet metal and a second end 152, also fabricated from sheet metal. The first end is sealed and the second end is fluidly connected with a vent 153. The operation of booster 107 is essentially similar to that previously described for booster 7 illustrated in FIG. 2, however, there are some differences. The booster 107 may be fluidly connected with the compressor 147 via a check valve as previously described or via a pressure regulator 270 which allows the compressor 147 to run continuously. The vent 153 for the system can be routed to feed back into the compressor and/or alternatively flow to the atmosphere. To prevent the entrapment of moisture within the compressor 147, a desiccant dryer 27 is connected with the compressor 147 to dry any incoming air. The moisture trapped within the desiccant of the dryer will be removed from the air leaving the vent 153 upon operation of the booster 107. (NOTE: The air supply 147 may also be utilized for other portions of the vehicle requiring an air supply.)

Figure 6:
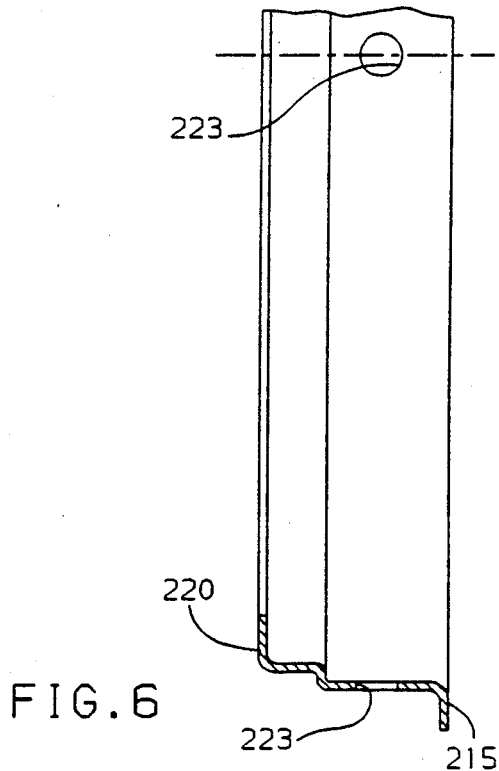
FIG. 6 is a side elevational view of the diaphragm retention annular tube.

Within the housing 150 are two annular flexible diaphragms 141 and 142, which are spaced from one another forming a sealed air storage second chamber 157. Improvement provided by the embodiment of FIG. 3 present invention, is that the power piston 216 is provided by two halves which are threadably mated with one another along thread surface 205. Looking at bladder 142 in more detail, bladder 142 has a bulb 206. The bladder 142 is captured between the first portion 203 of the power piston which extends generally parallel to the axis of the travel of the power piston, and an annular ring member or band 210. Annular ring member 210 is inserted within half 201 (shown in enlarged detail in FIG. 9) of the power piston 116 in a manner which causes a radial interference. Ring member 210 also has an indented portion 211 formed to mate with the bulk of the diaphragm and a radial limiting portion 212 which abuts against a rib 214 of the power piston first half 201. In like manner, another annular ring 220 (shown enlarged in FIG. 6) is placed in a radially interference manner capturing bladder 141 with the second portion 204 of the second half of the power piston 202. Fing members 210, and 220 have a series of perforations 223 allowing admittance of air into their interior and also have abutting ends 215 contacting one another. Typically the abutting ends 215 need not be fixably connected with one another. To protect the bladders from over inflation there is a pressure relief valve 287 which allows pressure from the second chamber 157 to be vented to the atmosphere.

Placed within a wall of the power piston second half 202, (which is a pressure barrier between the chamber 157 in the vent 153) is an umbrella check valve 23. The umbrella check valve 230 has a mushroom 232 which overlaps a hardened washer 236. The washer 236 covers a series of geometrically spaced apertures 231 allowing the passage of fluid from the vented area of the booster 107 into the second chamber 157. The umbrella check valve 230 also has a stem 238 with a thickened portion 233 which captures the stem within an aperture of the second half of the power piston. The special advantage provided by this umbrella check valve 230 utilized in conjunction with the washer 236 is that it can act as a check valve for very high pressures from 250 to 300 psi and prevents the very fragile mushroom portion of the umbrella check valve from being extruded through the aperture 231. However, if for some reason the vented area of the booster must be fluidly connected with the second chamber (this can occur when there is a malfunction in the venting system due to clogging up the air dryer 271 desiccant or compressor lines. In cases of the above malfunctions the venting through the check valve 250 will be advantages to decrease the foot pedal force necessary to operate the brake. In such situations, air will be permitted to flow through the apertures 231 from the vented area into the second chamber leaking past the washer 236 and lift the same whenever the pressure within the vented area exceeds that within the second chamber area 157. The present invention also provides an inlet valve 111 which operates in a manner almost identical to that shown for inlet valve 11 illustrated in FIG. 2. However, instead of being directly slidably mounted within the power piston as is control valve 11 in FIG. 2, control valve 111 is mounted by concentric lip seals 129 and 126. The lip seals 129 and 126 both have backing them up concentric ring reinforcement member 242 and 226 respectively. The special mounting of inlet valve 111 by the lip seals 129 and 126 allows the inlet valve 111 to adjust to greater misalignment along its axis and still be properly sealed. Therefore, possible misalignment between the control valve 108 and the power piston 116 can be better compensated, or more specifically any misalignment which could possibly increase the leakage of valving surface 110 with valve seat 112 can be minimized by allowing the inlet valve 111 to tilt slightly with respect to the axis 259 of travel of the power piston. The inlet valve 111 is biased by a spring 175 in a manner generally equivalent to that previously described for the embodiment for the booster shown in FIG. 2. The inlet valve 111 also has a passage 124 performing the function of that previously described for passage 24.

Figure 10:
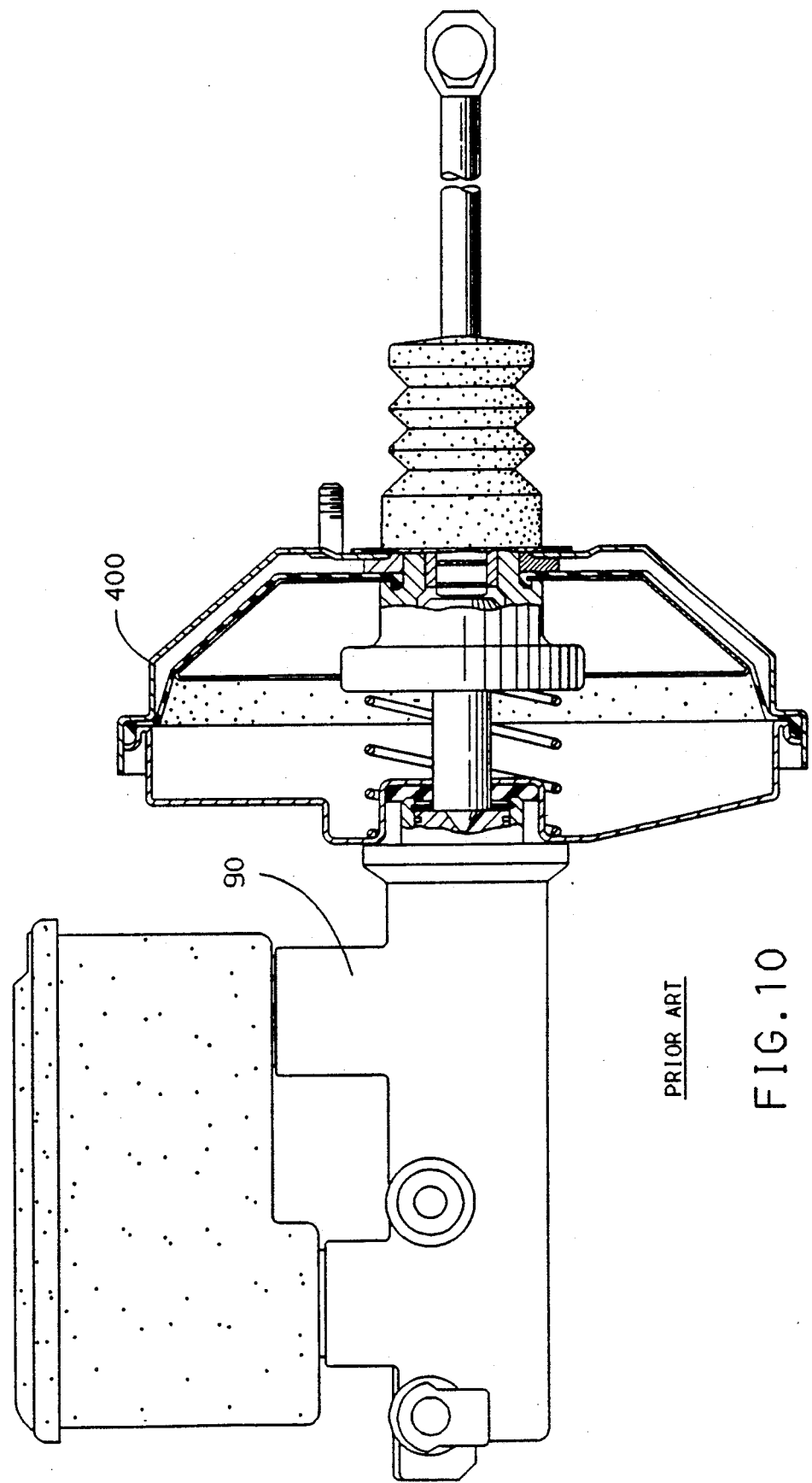
FIGS. 10 and 11 are sectional views of conventional prior art power pistons.
Figure 11:
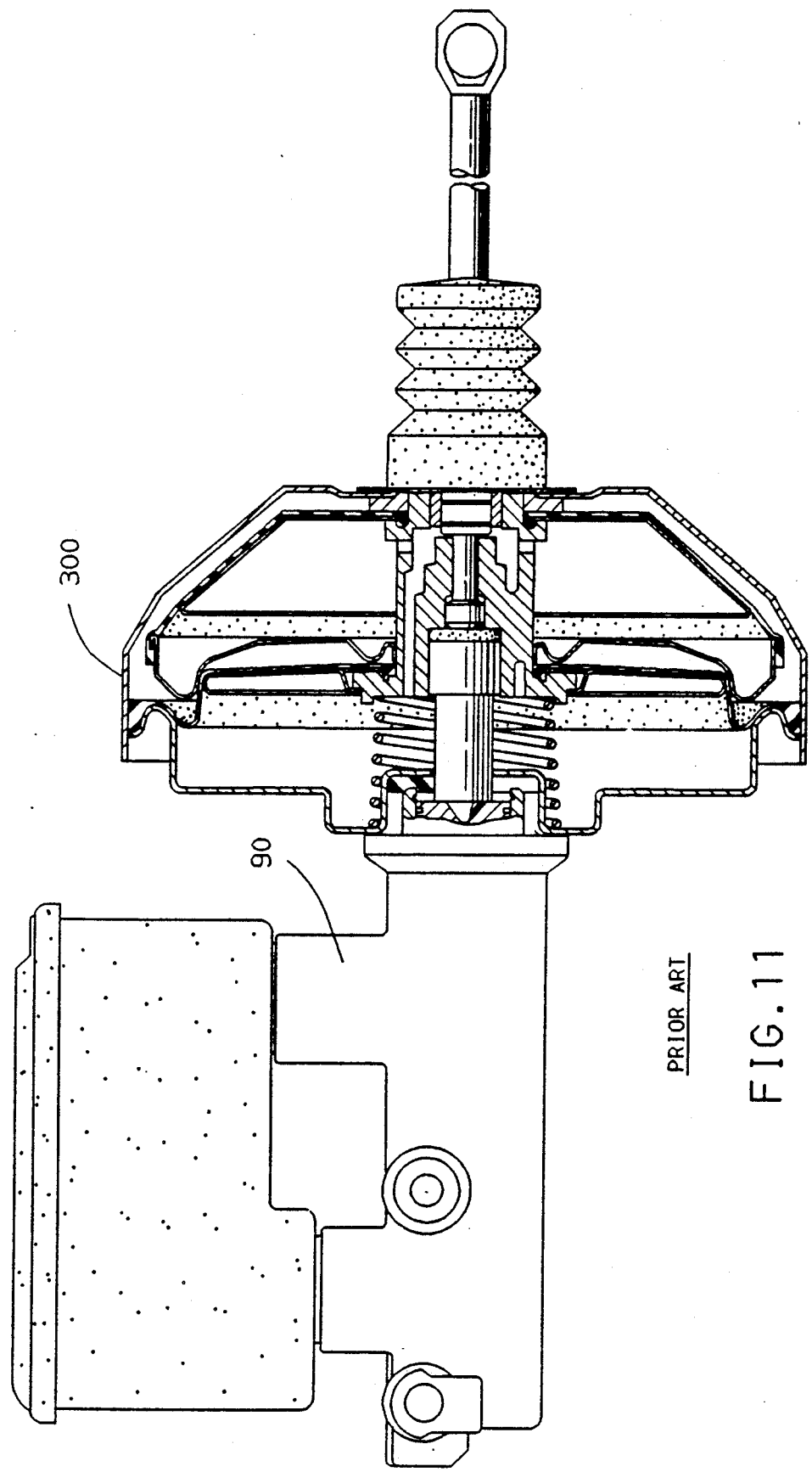

The power piston 116 is spring biased away from the master cylinder by a spring 146. Control valve 108 is a two-piece member having outer member 244 which provides a valving surface 137. Outer member 244 is adhesively connected to an inner member 246. The advantage of this configuration requires some explanation of the reaction system of this booster 107. Booster 107 has an elastomeric reaction disc 120. Abutting that reaction disc 120 is an insertable reaction ring 119. A reaction piston 123 generally abuts against member 246. Between the reaction disc 120 and the reaction piston 123 is a gap 251. The amount of gap provides a delay in the reaction force mechanism. The greater the gap the further the booster 107 must be activated before the reaction force is felt by the vehicle operator and vice versa. By providing a two-piece control valve 108 for a given booster the gap 251 may be set by placing the members 244 and 246 in a fixture and gluing them together to give the desired gap. This allows booster 107 to be utilized in different vehicle applications where either an instant reaction is desired (typically in sport type vehicles) or a more delayed reaction is desired (typically in large luxury type vehicles) by setting the relative position of members 246 and 244 in the fixture when allowing the adhesive to cure. The control valve 108 is spring biased by a spring 106 in a manner as that previously described, and also has a bumper 254 to cushion any impact between the control valve 108 and the power piston 116. The advantages of the two-piece control valve can also be utilized in prior art dual (FIG. 11) or single (FIG. 10) diaphragm vacuum power boosters 300, 400 which utilize the similar type reaction system, as shown in FIGS. 10 and 11.

Another advantage of the present invention is that it has an insertible reaction ring 119. Prior to this, the reaction ring portion of the reaction mechanism was provided by a dual diameter bore within the power piston. By allowing the utilization of an insertable reaction ring 119 the reaction ratio of the booster may be changed by changing the ring 119 instead of requiring a different power piston. This allows the booster 107 to have a reaction ratio which is variable and allows it to be used for a greater number of automotive applications.

As shown in FIG. 3, the booster has a one-piece push rod 260 which provides advantages over that in the prior art. Prior to the present invention, a push rod 260 were usually two-piece members. The distance to the gage point 273 of the cone to the mounting surface 264 of the booster is highly critical. The distance from the gage point to the end of the push rod is also critical in determining the gap 251. Previously it was common for the push rod to be two-pieces with an insertable gage member which was picked at the manufacturing facility after the measurement were determined. The present invention provides a one-piece push rod 260 assembly which is typically fabricated from a polymeric material which can be simply cut to length, therefore deleting the need for two separate members thereby lowering inventory requirements.

While an embodiment of the present invention has been explained, it will be readily apparent to those skilled in the art of the various modifications which can be made to the present invention without departing from the spirit and scope of this invention as it is encompassed by the following claims.

We claim:

1. An improved pressurized fluid vehicle brake booster for connection between a brake pedal linkage and a piston of a master cylinder, said booster in combination including:

a housing having means of connection with said vehicle and said master cylinder, said housing also having a fluid inlet and said housing having a first end being generally sealed and having a second end of said housing with a vent;

first and second annular flexible diaphragms spaced from one another forming a sealed second chamber within said housing and a sealed first chamber between said first diaphragm and said first end of said housing, said second chamber being in fluid communication with said housing fluid inlet;

a generally annular shaped power piston operatively associated with said master cylinder piston, said power piston being spring biased in a first direction and said power piston exterior being connected with both of said diaphragms, said power piston having a first fluid passage connecting said second chamber with said power piston interior and a second fluid passage from said interior of said power piston to an area in said second end of said housing;

a chamber valve seat separating said first and second chambers;

a spring biased annular inlet valve slidably mounted within said power piston with a fluid passage between an exterior of said inlet valve and an interior of said inlet valve, said inlet valve having a valving surface of a first diameter in contact with said chamber valve seat preventing fluid communication between said power piston first passage and said first chamber and said inlet valve having a first exterior sealed sliding surface at said same diameter of said valving surface, and said inlet valve having a second exterior sealed sliding surface at a second diameter which differs from said first diameter of said first sealed sliding surface and said inlet valve having a valve seat; and a control valve spring biased away from said power piston and connected with said pedal linkage and being slidably and sealably mounted within first end of said housing at said second diameter, said control valve having a valving surface at said second diameter for contacting said inlet valve seat, whereby movement of said control valve by said brake pedal causes said control valve valving surface to contact said inlet valve seat to seal off the interior of said inlet valve from said vent and further movement of said control valve against said spring biasing of said inlet valve causes said inlet valve valving surface to be removed from said chamber valve seat allowing fluid from said second chamber to pass to said first chamber to urge said power piston against said master cylinder piston and whereby in said activated position said inlet valve and said control valve are pressured balanced by said fluid, wherein the improvement comprises;

a check valve allowing flow towards said second chamber from said vent when the pressure within said vent exceeds the pressure within said second chamber.

2. An apparatus as described in claim 1 wherein said check valve is on said power piston.

3. An apparatus as described in claim 2 wherein said check valve is an umbrella type valve and wherein the stem of said umbrella is surrounded by a washer, said washer covering apertures provided in said power piston and said umbrella having a thickened stem portion holding said umbrella to said power piston wall and said washer being adjacent to a mushroom of said umbrella check valve and being covered by the same when the pressure within said second chamber is greater than the pressure within said vent, and wherein said washer can be dislodged from said apertures in said power piston when the pressure within said vent is greater than the pressure within said second chamber.

4. An umbrella check valve for permitting flow in one direction between two chambers of a brake booster separated by a generally rigid barrier, said umbrella check valve having a stem portion with a thickened portion of said stem for insertion through an aperture of said rigid structure and said stem being connected with a mushroom for covering over at least one aperture in said rigid structure to allow movement of a fluid therethrough, and a steel washer captured between said mushroom and said rigid structure generally covering said aperture preventing said mushroom from being extruded through said aperture when said pressure on one side of said chamber is excessive, said mushroom also overlapping said washer to sealably engage said rigid structure, and wherein when said check valve opens said flow pushes said washer away from said aperture to allow said flow through said apertures.

5. An improved pressurized fluid vehicle brake booster connection between a brake pedal linkage and a piston of a master cylinder, said booster in combination including:

a housing having means of connection with said vehicle and said master cylinder, said housing also having a fluid inlet and said housing having a first end being generally sealed and having a second end of said housing with a vent;

first and second annular flexible diaphragms spaced from one another forming a sealed second chamber within said housing and a sealed first chamber between said first diaphragm and said first end of said housing, said second chamber being in fluid communication with said housing fluid inlet;

a generally annular shaped power piston operatively associated with said master cylinder piston, said power piston being spring biased in a first direction and said power piston exterior being connected with both of said diaphragms, said power piston having a first fluid passage connecting said second chamber with said power piston interior and a second fluid passage from said interior of said power piston to an area in said second end of said housing;

a chamber valve seat separating said first and second chambers;

a spring biased annular inlet valve slidably mounted within said power piston with a fluid passage between an exterior of said inlet valve and an interior of said inlet valve, said inlet valve having a valving surface of a first diameter in contact with said chamber valve seat preventing fluid communication between said power piston first passage and said first chamber and said inlet valve having a first exterior sealed sliding surface at said same diameter of said valving surface, and said inlet valve having a second exterior sealed sliding surface at a second diameter which differs from said first diameter of said first sealed sliding surface and said inlet valve having a valve seat; and a control valve spring biased away from said power piston and connected with said pedal linkage and being slidably and sealably mounted within first end of said housing at said second diameter, said control valve having a valving surface at said second diameter for contacting said inlet valve seat, whereby movement of said control valve by said brake pedal causes said control valve valving surface to contact said inlet valve seat to seal off the interior of said inlet valve from said vent and further movement of said control valve against said spring biasing of said inlet valve causes said inlet valve valving surface to be removed from said chamber valve seat allowing fluid from said second chamber to pass to said first chamber to urge said power piston against said master cylinder piston and whereby in said activated position said inlet valve and said control valve are pressured balanced by said fluid, wherein the improvement comprises;

said power piston having an axis of travel and a first portion generally aligned with said axis of travel;

an annular band generally aligned with and inserted within said power piston first portion in a radial interference fit, said band capturing one of said diaphragms between said band and said power piston first portion.

6. A brake booster as described in claim 5 further including an axial stop limiting the insertion of said annular tube within said power piston.

7. A brake booster as described in claim 5 wherein said power piston has two first portions generally projecting towards one another wherein a tube is press-fitted within both of said parts of said power piston radially interference fit securing said first and second bladders to said power piston.

8. A brake booster as described in claim 5 further including the end of said diaphragm having a bulb portion captured by said annular ring.

9. An improved pressurized fluid vehicle brake booster for connection between a brake pedal linkage and a piston of a master cylinder, said booster in combination including:

a housing having means of connection with said vehicle and said master cylinder, said housing also having a fluid inlet and said housing having a first end being generally sealed and having a second end of said housing with a vent;

first and second annular flexible diaphragms spaced from one another forming a sealed second chamber within said housing and a sealed first chamber between said first diaphragm and said first end of said housing, said second chamber being in fluid communication with said housing fluid inlet;

a generally annular shaped power piston operatively associated with said master cylinder piston, said power piston being spring biased in a first direction and said power piston exterior being connected with both of said diaphragms, said power piston having a first fluid passage connecting said second chamber with said power piston interior and a second fluid passage from said interior of said power piston to an area in said second end of said housing;

a chamber valve seat separating said first and second chambers;

a spring biased annular inlet valve slidably mounted within said power piston with a fluid passage between an exterior of said inlet valve and an interior of said inlet valve, said inlet valve having a valving surface of a first diameter in contact with said chamber valve seat preventing fluid communication between said power piston first passage and said first chamber and said inlet valve having a first exterior sealed sliding surface at said same diameter of said valving surface, and said inlet valve having a second exterior sealed sliding surface at a second diameter which differs from said first diameter of said first sealed sliding surface and said inlet valve having a valve seat; and a control valve spring biased away from said power piston and connected with said pedal linkage and being slidably and sealably mounted within first end of said housing at said second diameter, said control valve having a valving surface at said second diameter for contacting said inlet valve seat, whereby movement of said control valve by said brake pedal causes said control valve valving surface to contact said inlet valve seat to seal off the interior of said inlet valve from said vent and further movement of said control valve against said spring biasing of said inlet valve causes said inlet valve valving surface to be removed from said chamber valve seat allowing fluid from said second chamber to pass to said first chamber to urge said power piston against said master cylinder piston and whereby in said activated position said inlet valve and said control valve are pressured balanced by said fluid, wherein the improvement comprises;

a first lip seal mounted within said power piston, said lip seal mounting said inlet valve on one of said inlet valve sliding sealed surfaces.

10. A brake booster as described in claim 9 further comprising a second lip seal concentric with said first lip seal mounted within said power piston, said lip seals mounting said inlet valve on said inlet valve first and second sliding seal surfaces.

11. An improved pressurized fluid vehicle brake booster for connection between a brake pedal linkage and a piston of a master cylinder, said booster in combination including:

a housing having means of connection with said vehicle and said master cylinder, said housing also having a fluid inlet and said housing having a first end being generally sealed and having a second end of said housing with a vent;

first and second annular flexible diaphragms spaced from one another forming a sealed second chamber within said housing and a sealed first chamber between said first diaphragm and said first end of said housing, said second chamber being in fluid communication with said housing fluid inlet;

a generally annular shaped power piston operatively associated with said master cylinder piston, said power piston being spring biased in a first direction and said power piston exterior being connected with both of said diaphragms, said power piston having a first fluid passage connecting said second chamber with said power piston interior and a second fluid passage from said interior of said power piston to an area in said second end of said housing;

a chamber valve seat separating said first and second chambers;

a spring biased annular inlet valve slidably mounted within said power piston with a fluid passage between an exterior of said inlet valve and an interior of said inlet valve, said inlet valve having a valving surface of a first diameter in contact with said chamber valve seat preventing fluid communication between said power piston first passage and said first chamber and said inlet valve having a first exterior sealed sliding surface at said same diameter of said valving surface, and said inlet valve having a second exterior sealed sliding surface at a second diameter which differs from said first diameter of said first sealed sliding surface and said inlet valve having a valve seat; and a control valve spring biased away from said power piston and connected with said pedal linkage and being slidably and sealably mounted within first end of said housing at said second diameter, said control valve having a valving surface at said second diameter for contacting said inlet valve seat, whereby movement of said control valve by said brake pedal causes said control valve valving surface to contact said inlet valve seat to seal off the interior of said inlet valve from said vent and further movement of said control valve against said spring biasing of said inlet valve causes said inlet valve valving surface to be removed from said chamber valve seat allowing fluid from said second chamber to pass to said first chamber to urge said power piston against said master cylinder piston and whereby in said activated position said inlet valve and said control valve are pressured balanced by said fluid, wherein the improvement comprises;

a pressure relief valve allowing flow from said second chamber to said vent when the pressure within said second chamber exceeds a predetermined value.

12. A pressurized pneumatic vehicle brake booster for connection between a brake pedal linkage and a piston of a master cylinder, said booster in combination comprising:

a housing having an inlet and said housing having a first end being generally sealed and a second end with a vent;

first and second annular flexible diaphragms spaced from one another forming a sealed second chamber within said housing between said diaphragms and a sealed first chamber between said first diaphragm and said first end of said housing and said second chamber being in fluid connection with said housing fluid inlet;

a generally annular shaped power piston operatively associated with said master cylinder piston and for imparting a force thereto, said power piston being spring biased away from said master cylinder and said power piston exterior being connected with both of said diaphragms, said power piston having a valve seat separating said first and second chambers, and said power piston having a first fluid passage connecting said second chamber with said power piston interior and a second fluid passage from the interior of said power piston into an area of said housing second end;

an annular inlet valve spring biased away from said master cylinder and slidably mounted within said power piston with a fluid passage between an exterior of said inlet valve and an interior of said inlet valve, said inlet valve having a valving surface at a first diameter for contact with said power piston valve seat for preventing fluid communication between said power piston first passage and said first chamber, and said inlet valve having a first exterior sealed sliding surface at the same diameter of said valving surface, and said inlet valve having a second exterior sealed sliding surface at a second diameter less than said first diameter and said inlet valve having a valve seat; and a two piece adhesively joined control valve spring biased away from said power piston and connected with said pedal linkage and being slidably and sealably mounted at said second diameter along said first end of said housing, said control valve having a valving surface at said second diameter for contacting said inlet valve seat, and said control valve having mechanical feedback means for imparting to said control valve a fraction of the force imparted by said power piston upon said master cylinder piston and whereby movement of said control valve from said brake pedal causes said control valve valving surface to contact said inlet valve seat to seal off the interior of said inlet valve from said vent and further movement of said control valve against said spring biasing causes said inlet valve valving surface to be removed from said power piston valve seat allowing fluid from said second chamber to pass to said first chamber to urge said power piston against said master cylinder piston and whereby in said activated position said inlet valve and said control valve are pressure balanced by said pressurized air.

13. An improved pressurized pneumatic vehicle brake booster for connection between a brake pedal linkage and a piston of a master cylinder, said booster in combination comprising:

a housing having an inlet and said housing having a first end being generally sealed and a second end with a vent to the atmosphere;

first and second annular flexible diaphragms spaced from one another forming a sealed second chamber within said housing between said diaphragms and a sealed first chamber between said first diaphragm and said first end of said housing and said second chamber being in fluid connection with said housing fluid inlet;

a generally annular shaped power piston operatively associated with said master cylinder piston and for imparting a force thereto, said power piston being spring biased away from said master cylinder and said power piston exterior being connected with both of said diaphragms, said power piston having a valve seat separately said first and second chambers, and said power piston having a first fluid passage connecting said second chamber with said power piston interior and a second fluid passage from the interior of said power piston into an area of said housing second end;

an annular inlet valve spring biased away from said master cylinder and slidably mounted within said power piston with a fluid passage between an exterior of said inlet valve and an interior of said inlet valve, said inlet valve having a valving surface at a first diameter for contact with said power piston valve seat for preventing fluid communication between said power piston first passage and said first chamber, and said inlet valve having a first exterior sealed sliding surface at the same diameter of said valving surface, and said inlet valve having a second exterior sealed sliding surface at a second diameter less than said first diameter and said inlet valve having a valve seat; and a control valve spring biased away from said power piston and connected with said pedal linkage and being slidably and sealably mounted at said second diameter along said first end of said housing, said control valve having a valving surface at said second diameter for contacting said inlet valve seat, and said control valve having mechanical feedback means for imparting to said control valve a fraction of the force imparted by said power piston upon said master cylinder piston and whereby movement of said control valve from said brake pedal causes said control valve valving surface to contact said inlet valve seat to seal off the interior of said inlet valve from said vent and further movement of said control valve against said spring biasing causes said inlet valve valving surface to be removed from said power piston valve seat allowing fluid from said second chamber to pass to said first chamber to urge said power piston against said master cylinder piston and whereby in said activated position said inlet valve and said control valve are pressure balanced by said pressurized air, wherein said improvement comprises;

said mechanical feed back means include a control valve with an axial bore with an insertable reaction ring.

14. A pressurized fluid vehicle brake booster system for connection between a brake pedal linkage and a piston of a master cylinder, said booster in combination including:

a housing having means of connection with said vehicle and said master cylinder, said housing also having a fluid inlet and said housing having a first end being generally sealed and having a second end of said housing with a vent;

first and second annular flexible diaphragms spaced from one another forming a sealed second chamber within said housing and a sealed first chamber between said first diaphragm and said first end of said housing, said second chamber being in fluid communication with said housing fluid inlet;

a generally annular shaped power piston operatively associated with said master cylinder piston, said power piston being spring biased in a first direction and said power piston exterior being connected with both of said diaphragms, said power piston having a first fluid passage connecting said second chamber with said power piston interior and a second fluid passage from said interior of said power piston to an area in said second end of said housing;

a chamber valve seat separating said first and second chambers;

a spring biased annular inlet valve slidably mounted within said power piston with a fluid passage between an exterior of said inlet valve and an interior of said inlet valve, said inlet valve having a valving surface of a first diameter in contact with said chamber valve seat preventing fluid communication between said power piston first passage and said first chamber and said inlet valve having a first exterior sealed sliding surface at said same diameter of said valving surface, and said inlet valve having a second exterior sealed sliding surface at a second diameter which differs from said first diameter of said first sealed sliding surface and said inlet valve having a valve seat;

a control valve spring biased away from said power piston and connected with said pedal linkage and being slidably and sealably mounted within first end of said housing at said second diameter, said control valve having a valving surface at said second diameter for contacting said inlet valve seat, whereby movement of said control valve by said brake pedal causes said control valve valving surface to contact said inlet valve seat to seal off the interior of said inlet valve from said vent and further movement of said control valve against said spring biasing of said inlet valve causes said inlet valve valving surface to be removed from said chamber valve seat allowing fluid from said second chamber to pass to said first chamber to urge said power piston against said master cylinder piston and whereby in said activated position said inlet valve and said control valve are pressured balanced by said fluid, wherein the improvement comprises;

means for supplying compressed air to said booster fluidly connected with said booster chamber;

a desiccant drying means fluidly connected with said supplier means for supplying dried air to said supplying means; and means to fluidly connect said vent of said brake booster with said drying means to remove moisture from the same.

* * * * *